(12) United States Patent
Lee et al.

(10) Patent No.: US 8,519,631 B2
(45) Date of Patent: Aug. 27, 2013

(54) CONSTANT CURRENT LED LAMP

(75) Inventors: Yu-Lin Lee, Xinbei (TW); Shih-Jen Liao, Taoyuan (TW)

(73) Assignees: Trend Lighting Corp., Taoyuan (TW); Yu-Lin Lee, New Taipei (TW)

( * ) Notice: Subject to any disclaimer, the term of this patent is extended or adjusted under 35 U.S.C. 154(b) by 215 days.

(21) Appl. No.: 13/080,850

(22) Filed: Apr. 6, 2011

(65) Prior Publication Data

US 2012/0119674 A1 May 17, 2012

(30) Foreign Application Priority Data

Nov. 12, 2010 (TW) .............................. 99221907 U
Dec. 31, 2010 (TW) .............................. 99225740 U

(51) Int. Cl.
*H05B 37/00* (2006.01)
*H05B 39/00* (2006.01)
*H05B 41/00* (2006.01)

(52) U.S. Cl.
USPC ......... 315/193; 315/185 R; 315/291; 315/294

(58) Field of Classification Search
None
See application file for complete search history.

(56) References Cited

U.S. PATENT DOCUMENTS

| 2008/0143274 A1* | 6/2008 | Itou et al. ...................... 315/307 |
| 2010/0295460 A1* | 11/2010 | Lin et al. ...................... 315/193 |
| 2011/0163679 A1* | 7/2011 | Chiang et al. ............. 315/185 R |
| 2011/0199003 A1* | 8/2011 | Muguruma et al. .......... 315/122 |

* cited by examiner

*Primary Examiner* — Anh Tran
(74) *Attorney, Agent, or Firm* — Jackson IPG PLLC

(57) ABSTRACT

A constant current LED lamp is provided with a linear driver circuit for driving multiple light emitting diodes (LEDs), or LED packages including multiple LED chips, connected in series. The driver circuit includes a rectifier circuit, a filter circuit, a stable voltage circuit, and a constant current circuit. The driver circuit allows the aggregate forward voltage drop of all the LEDs connected in series to approach the rectified input voltage to efficiently utilize the AC power from the mains.

6 Claims, 6 Drawing Sheets

CONSTANT CURRENT LED LAMP

BACKGROUND OF THE INVENTION

1. Field of the Invention

This invention relates to a constant current LED lamp with a linear driver.

2. Description of the Related Art

Light-emitting diodes (LEDs) for general illumination applications are gaining popularity for their long service life and low power consumption. In such applications, the LEDs have to be provided with a driver circuit to convert the AC power of the mains to DC, for the LEDs are driven by DC current.

As shown in FIG. 1(A), an LED driver circuit 1 is connected to at least one LED 12 and adapted to receive an AC power VAC. The LED driver circuit 1 is a switching mode power supply, which mainly comprises a bridge rectifier 10, an electromagnetic interference restraining circuit 11, a filter circuit 16, a high frequency switching circuit 13, a converter circuit 14, and a feedback circuit 15, wherein the bridge rectifier 10 is used to rectify the VAC into a pulsed DC power, while the filter circuit 16 dampens the voltage swings of the DC power. The frequency of the DC power is controlled by the high frequency switching circuit 13, and the converter circuit 14 is used to convert the high voltage into a low voltage DC power that is supplied to the LED 12. The feedback circuit 15 can detect the magnitude of total voltage load of the LED 12, and thereby regulate the output voltage of the converter circuit 14.

Although the conventional LED driver circuit 1 does drive the LED 12 to emit light, the architecture of the driver circuit is quite complicated, which results in a large circuit and a high cost. When the cost becomes a concern, the electromagnetic interference restraining circuit 11 is usually omitted, or the component specifications are downgraded, which could lead to poor power conversion efficiency.

A second conventional LED driver circuit is shown in FIG. 1(B). The LED driver circuit 1 mainly comprises a capacitor C and a bridge rectifier 10, the capacitance of capacitor C determines the voltage supplied to the rectifier, whereas the bridge rectifier 10 rectifies the AC power to a pulsed DC power that is supplied to the LED 12.

Although the second conventional LED driver circuit 1 does drive the LED 12 to emit light, this circuit is more suitable for low power applications. Since the capacitor C typically is a high voltage plastic capacitor of small capacitance and large size, in the case of higher power applications, several capacitors have to be connected in parallel to increase the capacitance, which leads to increased circuit size and cost.

SUMMARY OF THE INVENTION

The inventors of the present invention developed a constant current LED lamp, and particularly, a constant current LED lamp with a linear driver circuit.

The driver circuit of this invention drives multiple LEDs, or LED packages that comprise multiple chips, connected in series. The driver circuit allows the aggregate forward voltage drop of the LEDs connected in series to approach the rectified input voltage, such that the AC power is efficiently utilized. The driver circuit comprises a rectifier circuit, a filter circuit, a stable voltage circuit, and a constant current circuit. This circuit contains no switching component, and therefore causes no electromagnetic interference.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1A:
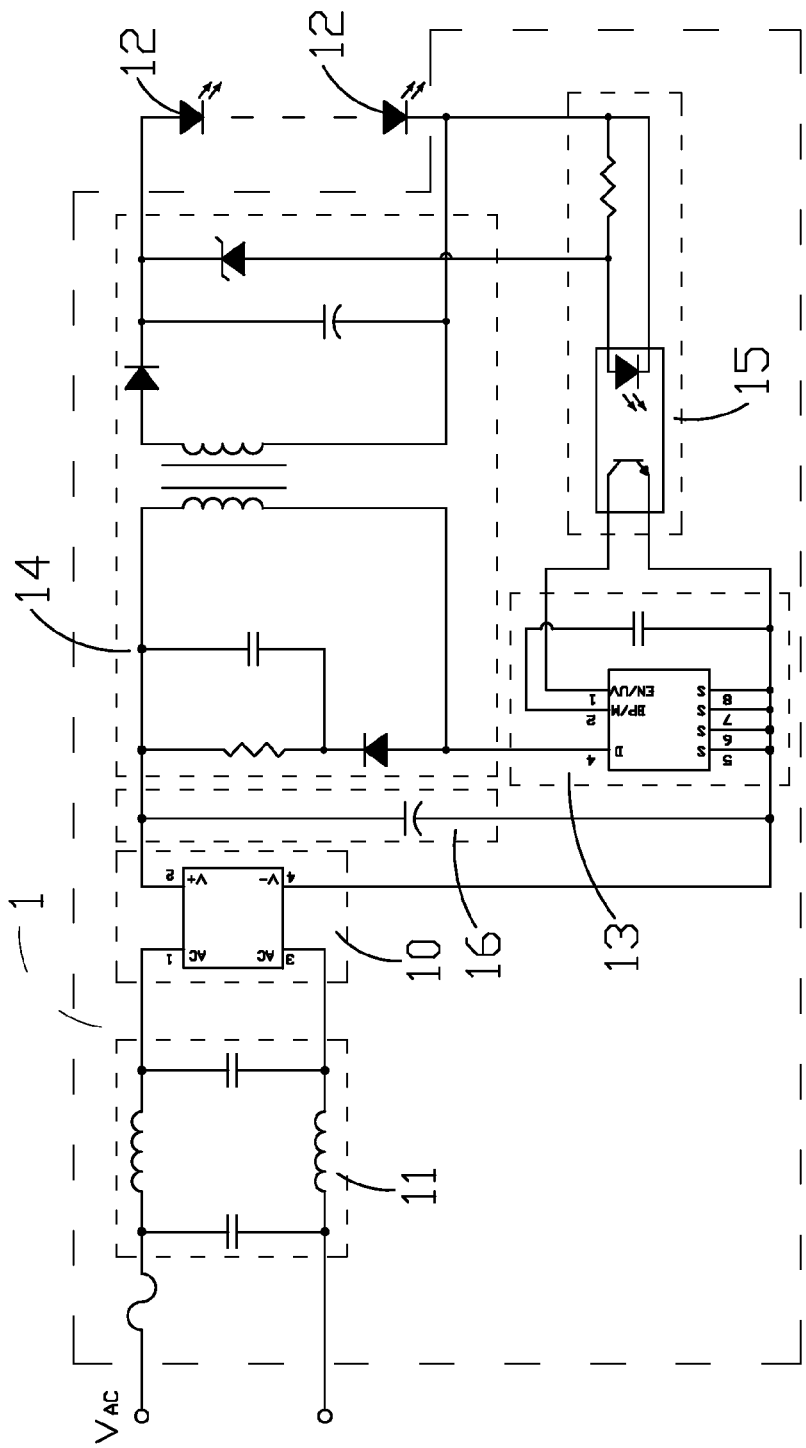
FIG. 1(A) and (B) are schematic diagrams of conventional LED driver circuits.
Figure 1B:
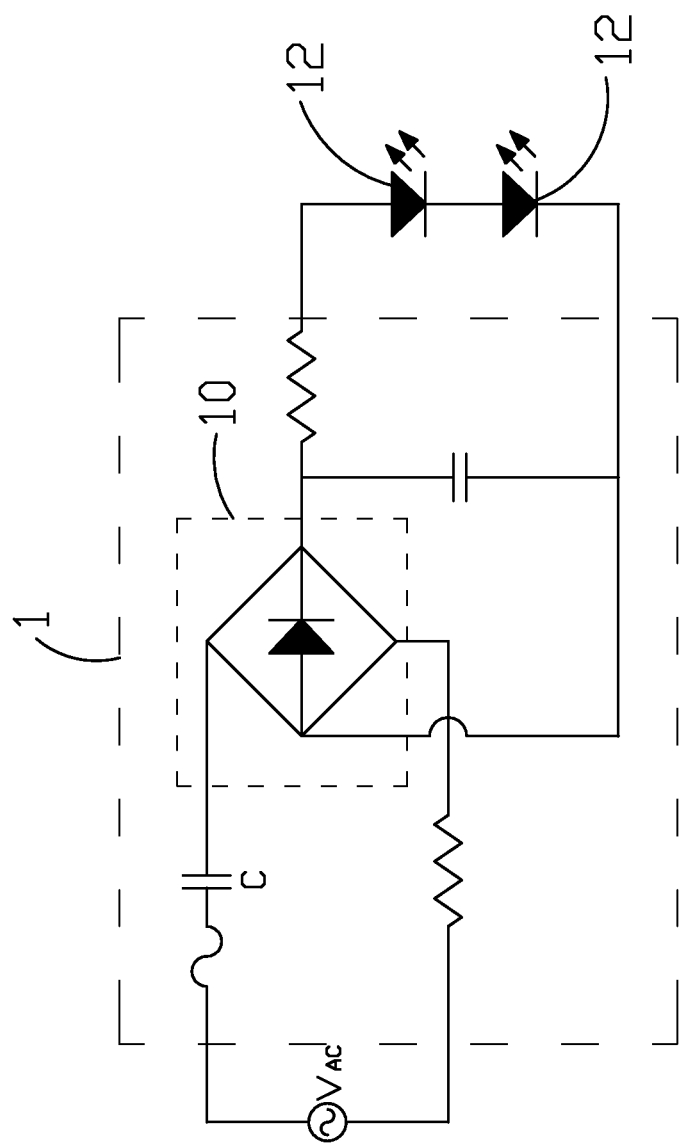
Figure 2:
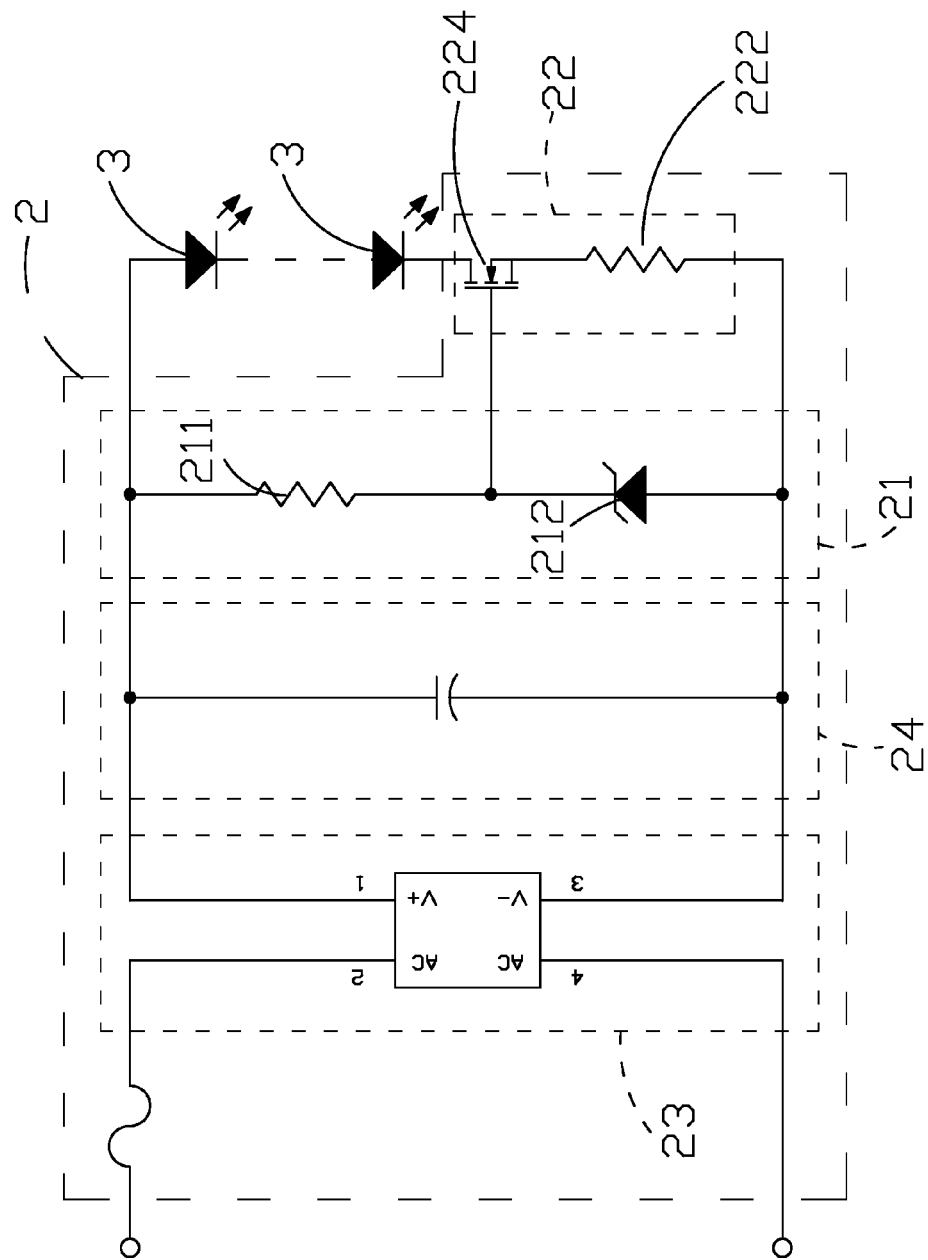
FIG. 2 is a schematic diagram of a driver circuit according to the first embodiment of the invention.

With reference to FIG. 2, a driver circuit in accordance with a first embodiment of the invention is depicted. The driver circuit 2 of the invention is used to drive multiple LEDs, or LED packages that comprise multiple chips, connected in series. The driver circuit 2 comprises a rectifier circuit 23, a filter circuit 24, a stable voltage circuit 21, and a constant current circuit 22.

The rectifier circuit 23 may by way of example be a bridge rectifier for receiving an alternating current power and converting the alternating current power into a direct current power. The stable voltage circuit 21 is connected to the rectifier circuit 23 and comprises a first resistor 211 and a voltage stabilizer 212 (which may by way of example be a Zener diode) connected in series for generating a constant voltage. The constant current circuit 22 is connected to the stable voltage circuit 21, and is further connected in series to the light emitting diodes 3 to limit the driving current flowing into the light emitting diodes 3 and to maintain the current at a constant value.

According to the embodiment, the constant current circuit 22 may by way of example be a transistor 224, wherein the transistor 224 can be a MOSFET (metal-oxide-semiconductor field-effect transistor). When the MOSFET is operating in the saturation region, the characteristic of the MOSFET is such that the current flow through the light emitting diodes 3 remains constant when the gate to source voltage of the MOSFET, VGS, is fixed.

The present invention further includes a filter circuit 24 (which may by way of example be a capacitor) connected to the rectifier circuit 23. The filter circuit 24 dampens the voltage swings of the rectified DC power before transmitting the DC power to the stable voltage circuit 21 and the light emitting diodes 3, respectively.

Figure 3:
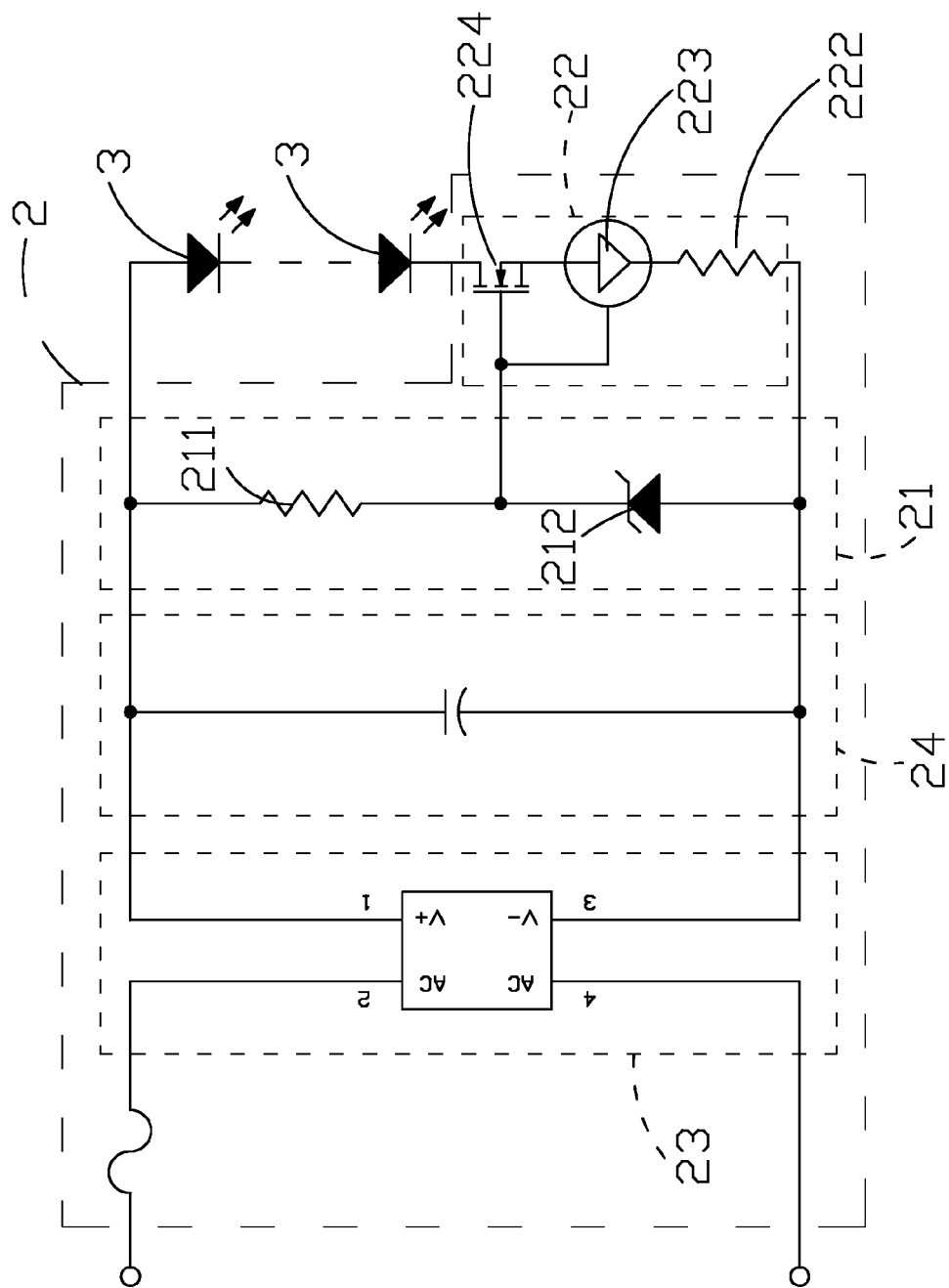
FIG. 3 is a schematic diagram of a driver circuit according to the second embodiment of the invention.

According to the second embodiment shown in FIG. 3, the driver circuit 2 similarly comprises a stable voltage circuit 21 and a constant current circuit 22. The constant current circuit 22 may by way of example include a transistor 224 (which may be a BJT (bipolar junction transistor) or a MOSFET) and a current limiting device 223 connected in series. The current limiting device 223 further limits the current flow through the LEDs, while the transistor absorbs the excess voltage.

In the first and second embodiments described above, the constant current circuit may be connected in series with a second resistor 222. The second resistor can be a variable resistor. The current flows through the LEDs, and consequently, the brightness of the LEDs can be regulated by adjusting the resistance of the resistor.

Figure 4:
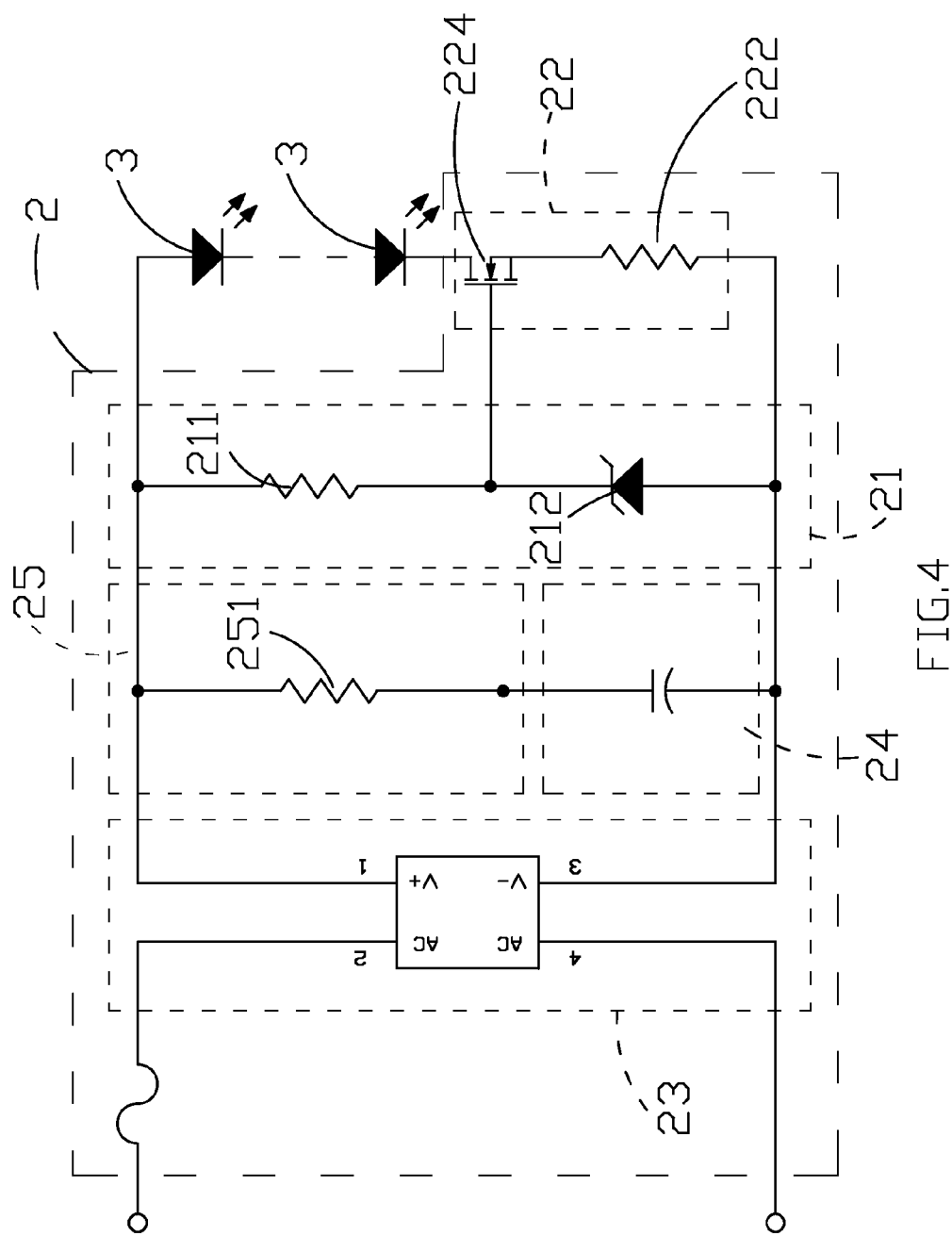
FIG. 4 is a schematic diagram of a driver circuit according to the third embodiment of the invention.
Figure 5:
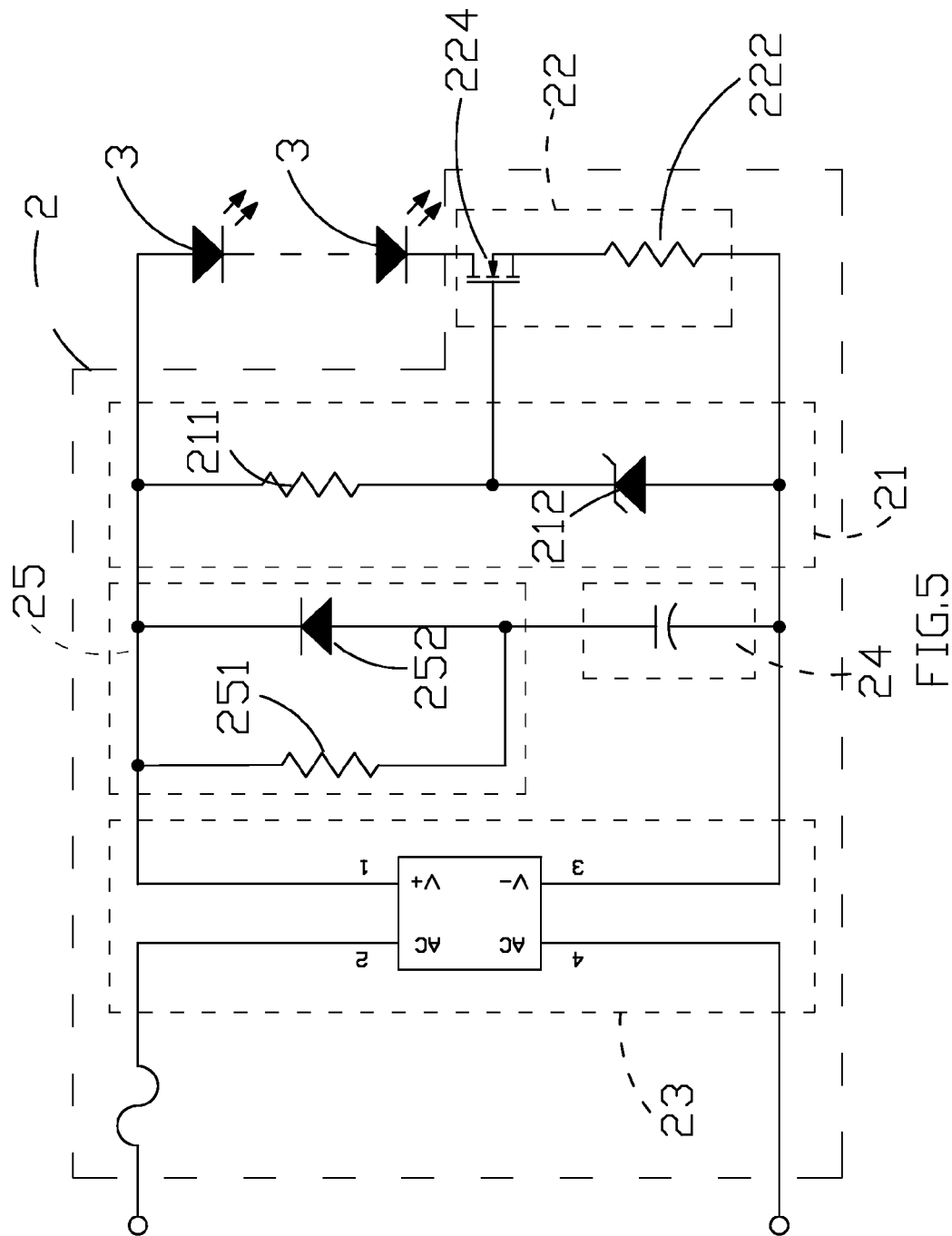
FIG. 5 is a schematic diagram of a driver circuit according to the fourth embodiment of the invention.

A power factor correction circuit may be further disposed in the foregoing embodiments to improve the power factor of the lamp. As shown in FIG. 4, where the first embodiment is taken as an example, a power factor correction circuit 25 is connected in series with the filter circuit 24. The power factor correction circuit 25 may by way of example be a third resistor 251. The third resistor 251 moderates the charging of the capacitor, such that the phase separation the input voltage and input current can be reduced to improve the power factor. Of course, the power factor correction circuit 25 may alternatively be a third resistor 251 and a diode 252 connected in parallel. As shown in FIG. 5, the diode 252 provides a low resistance path for discharging the capacitor.

The preferred embodiments offer the following advantages:
1. The driver circuit is a low cost circuit, but provides ample and stable DC power to the LEDs.
2. There is no need to dispose a transformer; the aggregate forward voltage drop of all the light emitting diodes connected in series can be designed to approach the rectified input voltage for high power efficiency.
3. There is no high frequency switching component, and accordingly, no electromagnetic radiation interference.

The LED driver circuit improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A constant current LED lamp provided with a driver circuit for driving multiple LEDs, or LED packages that comprise multiple chips, connected in series, the driver circuit comprising:
    a rectifier circuit for receiving an alternating current power and converting the alternating current power into a direct current power;
    a stable voltage circuit connected to the rectifier circuit and adapted for receiving the direct current power and for generating a constant voltage; and
    a constant current circuit connected to the stable voltage circuit, and having a metal-oxide-semiconductor field-effect transistor (MOSFET) and a second resistor connected in series with each other, and connected in series with the LEDs to allow a constant driving current to flow through the LEDs.

2. The constant current LED lamp as recited in claim 1, wherein the second resistor is a variable resistor.

3. The constant current LED lamp as recited in claim 1, wherein the transistor is further connected in series with a current limiting device.

4. The constant current LED lamp as recited in claim 1, further comprising a filter circuit coupled between the rectifier circuit and the stable voltage circuit to reduce the voltage swings of the rectified direct current power.

5. The constant current LED lamp as recited in claim 4, wherein the driver circuit is further provided with a power factor correction circuit connected in series with the filter circuit, and wherein the power factor correction circuit is a third resistor.

6. The constant current LED lamp as recited in claim 4, wherein the driver circuit is further provided with a power factor correction circuit connected in series with the filter circuit, and wherein the power factor correction circuit includes a third resistor and a diode mutually connected in parallel.

* * * * *

UNITED STATES PATENT AND TRADEMARK OFFICE
CERTIFICATE OF CORRECTION

| | | |
|---|---|---|
| PATENT NO. | : 8,519,631 B2 | Page 1 of 1 |
| APPLICATION NO. | : 13/080850 | |
| DATED | : August 27, 2013 | |
| INVENTOR(S) | : Yu-Lin Lee and Shih-Jen Liao | |

It is certified that error appears in the above-identified patent and that said Letters Patent is hereby corrected as shown below:

Title Page:

Item 75, the following inventor names and addresses should be listed as:

--Inventors: Yu-Lin Lee, New Taipei (TW), Shih-Jen Liao, Taoyuan (TW)--

Signed and Sealed this
Seventh Day of January, 2014

Margaret A. Focarino
*Commissioner for Patents of the United States Patent and Trademark Office*